United States Patent [19]

Ueda et al.

[11] Patent Number: 4,751,796
[45] Date of Patent: Jun. 21, 1988

[54] DEVICE FOR SUPPLYING GRINDING FLUID

[75] Inventors: Shuji Ueda, Neyagawa; Kazuhiko Fujino, Hirakata; Hiroshi Saeki, Neyagawa, all of Japan

[73] Assignee: Matsushita Electric Industrial Co., Ltd., Osaka, Japan

[21] Appl. No.: 746,717

[22] Filed: Jun. 20, 1985

[30] Foreign Application Priority Data

Jun. 25, 1984 [JP] Japan .................... 39-130349

[51] Int. Cl.⁴ .................... B24B 55/02
[52] U.S. Cl. .................... 51/267; 51/356
[58] Field of Search .......... 51/267, 33 W, 124 L, 51/356

[56] References Cited

U.S. PATENT DOCUMENTS

| | | | |
|---|---|---|---|
| 986,531 | 3/1911 | Wilson | 51/267 |
| 2,548,418 | 5/1951 | Berheim | 51/55 |
| 2,757,487 | 8/1956 | Coburn | 51/33 W |
| 2,818,696 | 1/1958 | Pigott | 51/267 |
| 3,466,811 | 9/1969 | Suddarth | 51/266 |

FOREIGN PATENT DOCUMENTS

| | | |
|---|---|---|
| 551858 | 8/1928 | Fed. Rep. of Germany . |
| 2905579 | 9/1979 | Fed. Rep. of Germany . |
| 3422213 | 1/1985 | Fed. Rep. of Germany . |
| 2537486 | 6/1984 | France . |
| 2079645 | 1/1982 | United Kingdom . |

Primary Examiner—Frederick R. Schmidt
Assistant Examiner—Maurina Rachuba
Attorney, Agent, or Firm—Stevens, Davis, Miller & Mosher

[57] ABSTRACT

A device is enclosed which is suitable for supplying grinding fluid to an apparatus for generating curved surfaces by means of a rotating grindstone, and which supplies grinding fluid to the grinding point under optimum conditions as the grinding point moves. It includes a means for turning nozzles, which discharge grinding fluid onto a grinding point from a fixed direction, about the axis of the grindstone, and is able to constantly ensure a sufficient supply of grinding fluid to the grinding point by controlling the turning so that the nozzles are always pointing in a fixed direction relative to the grinding point so that the tendency of clogging and wear of the grindstone is diminished.

6 Claims, 4 Drawing Sheets

DEVICE FOR SUPPLYING GRINDING FLUID

BACKGROUND OF THE INVENTION

This invention relates to a device which supplies the grinding fluid used in the grinding of optical lenses, mirrors, the curved parts of metal moulds and the like. By ensuring a constant and sufficient supply of grinding fluid to the grinding point, it makes possible superprecision processing with a guaranteed quality of surface and accuracy of curvature by preventing clogging and wear of the grindstone.

Under conventional methods of grinding curved surfaces, grinding fluid is supplied to the grindstone as in a manner shown in FIGS. 1a and 1b.

In FIGS. 1a and 1b, a numeral 1 denotes a grindstone attached to a rotating shaft which rotates at high speed in the direction a to grind the object being ground 2 to the specified curvature. This grindstone 1 and the object being ground 2 move relative to each other in the direction b so as to generate the desired cross-sectional curvature at right angles to the axis of the grindstone 1. The object being ground 2 also rotates in the direction c to generate a curved surface which is symmetry with respect to the axis of rotation.

To supply the grinding fluid, a nozzle 3 is provided to spout grinding fluid in a direction parallel to the axis of the grindstone 1, and another nozzle 4 is provided to discharge fluid at a tengent to the grindstone 1, so that grinding of the curved surface is carried out with fluid supplied in the vicinity of the grinding point.

However, under the above arrangement the grinding point slowly moves as the grinding progresses, so nozzles 3 and 4, which are set up at the start of grinding to supply grinding fluid, gradually lose their effectiveness in supplying the grinding point. Consequently, as the grinding processes, the quantity of fluid supplied to the grinding point becomes insufficient, clogging or wear of the grindstone 1 occurs, it becomes impossible to achieve the necessary precision for the object being ground 2, and the quality of the surface deteriorates.

SUMMARY OF THE INVENTION

Accordingly, an object of the invention is to prevent clogging and wear of a grindstone and thus improve the precision of an object being ground and the quality of its surface by ensuring that the position of the nozzles supplying the grinding fluid be controlled with respect to the grinding point such that they can ensure an effective supply of fluid to the grinding point at all times.

The above-described object of the invention is achieved by providing a nozzle turning means able to rotate the nozzles, which spout grinding fluid onto the grinding point, about the axis of the grindstone. Thus as the grinding point moves the nozzles are made to turn on the axis of the grindstone so that they point towards the grinding point and remain directed there at all times.

To this end, the invention provides a grinding fluid supplying device comprising a pump for discharging a grinding fluid; a grinding fluid introduction pipe connected to one end of the pump; a nozzle discharging the grinding fluid supplied by said pipe onto a grinding point from a direction parallel to the axis of the above-mentioned grindstone; a nozzle discharging the grinding fluid at a tangent to the grindstone at the grinding point; and a means for simultaneously turning the nozzles about the axis of rotation of the above-mentioned grindstone, so that both grinding fluid nozzles are constantly directed at and discharging fluid on the grinding point as it moves.

DESCRIPTION OF THE PREFERRED EMBODIMENT

A preferred embodiment of this invention will now be described with reference to the drawings.

Figure 1A:
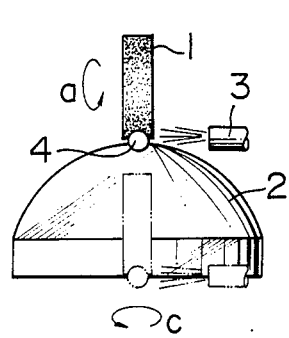
FIG. 1a shows a front view of the conventional method of supplying grinding fluid in the grinding of curved surfaces.
Figure 1B:
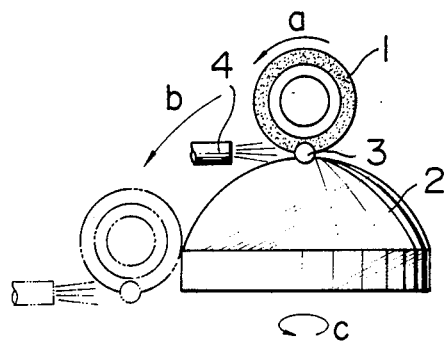
FIG. 1b is a side view of the same.
Figure 2:
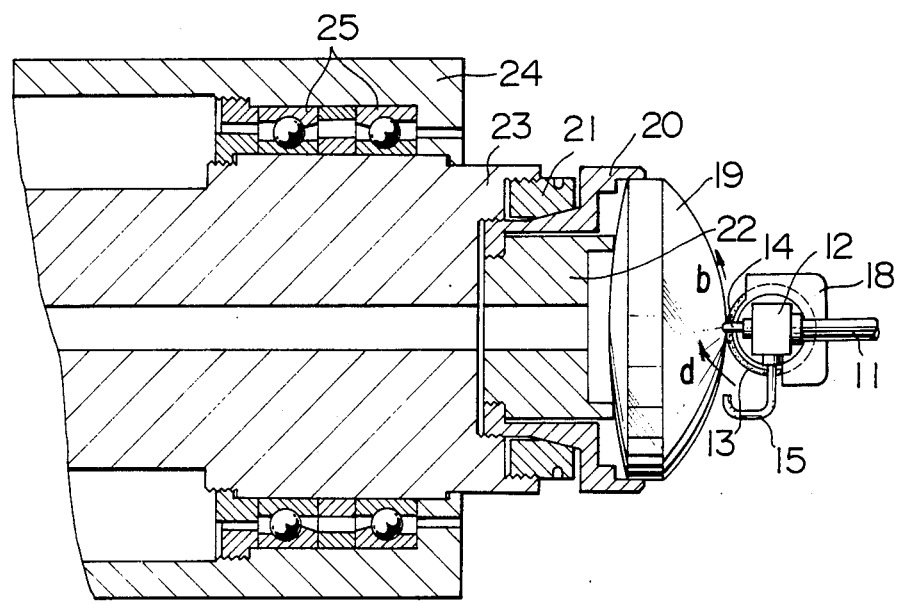
FIG. 2 is a plan view of an embodiment for supplying the grinding fluid in accordance with the invention.
Figure 3:
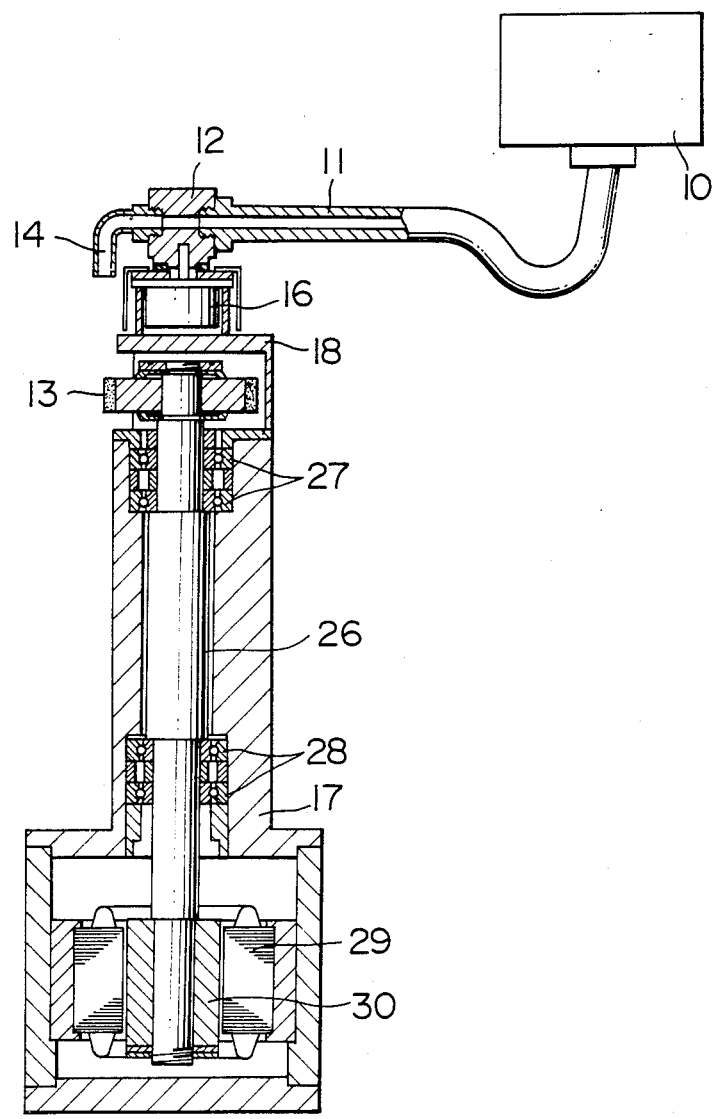
FIG. 3 is a front cross-sectional view showing the supply section of the grinding fluid supplying device shown in FIG. 2, together with the shaft of the grindstone.

Referring to FIGS. 2 and 3, a reference numeral 11 denotes a fluid introducing pipe, through which a grinding fluid pumped out from a pump 10 is introduced into a manifold 12. The grinding fluid is then led to the grinding point via a nozzle 14, which discharges fluid in a direction parallel to the axis of a grindstone 13 (composed of diamond granules etc. bonded with metal or resin bond), and a nozzle 15, which discharges fluid at a tangent to the grindstone 13 at the grinding point.

The manifold 12 and the nozzles 14 and 15 are made to turn on the axis of the grindstone 13 in the direction d shown in FIG. 2, by a DC or pulse drive motor 16. A numeral 17 denotes a shaft housing of the grindstone, and 18 denotes a protective cover for the grindstone. A glass lens or other object being groud is designated by a numeral 19. Numerals 20, 21 and 22 denote the collets, clamp rings and holders respectively for the object being ground. A numeral 23 denotes a shaft for rotating the object to be ground, 24 denotes a housing of the shaft, and 25 denotes a pair of ball-bearings.

In FIG. 3, a numeral 26 denotes a shaft for rotating the grindstone, 27 and 28 denote ball-bearings, and 29 and 30 denote the stator and rotor, respectively, of the motor for driving the grindstone.

The above is an explanation of the actual structure of the device for supplying grinding fluid: what follows is a description of how it works.

When grinding to a specified curvature, data for controlling the movement of the grindstone 13 and the object being ground 19 relative to each other on an X-Y table (not shown), are first calculated by computer according to a program which is beforehand stored in the grinding apparatus. In accordance with the thus computed data, the grindstone can be rotated at high speeds in the direction b shown in FIG. 2 by the drive motor having the stator 29 and rotor 30 so as to grind the object to the specified curvature.

The grindstone is then placed in position at the centre of rotation of the surface of the object to be ground, and nozzles 14 and 15 set so that they provide an effective flow of grinding fluid to the grinding point, in other words so that they are directed to the grinding point.

When the process starts, the grindstone 13 starts to move according to the pre-calculated control data mentioned above, so that the object being ground 19 will be ground to the specified curvature.

Figure 4:
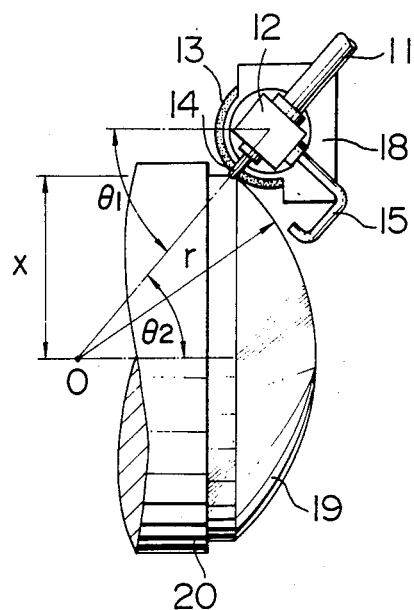
FIG. 4 is a plan view of the position of the grinding fluid supplying device shown in FIG. 2 when the grinding point has moved.

The angle $\theta$, which is the angle required to keep the nozzles 14 and 15 turning on the axis of the grindstone 13 and both directed at the grinding point, is equal to, where the object being ground has a spherical surface, the angle of turn $\theta_2$ of the grinding point around the center 0 of the spherical surface to be generated, as shown in FIG. 4.

This angle of turn $\theta_2$ is expressed by the formula $\theta_2 = \sin^{-1}(x/r)$, where r is a radius of the spherical surface being ground, and x a distance of the grinding point from the axis of rotation of the object being ground 19. The turning angle $\theta_1$ for the nozzles 14 and 15 is determined by calculating the angle $\theta_2$, which corresponds to the distance x, and is sent in the form of control data to the drive motor 16 so that the nozzles 14 and 15 are moved to aim at the grinding point as the process proceeds.

Figure 5:
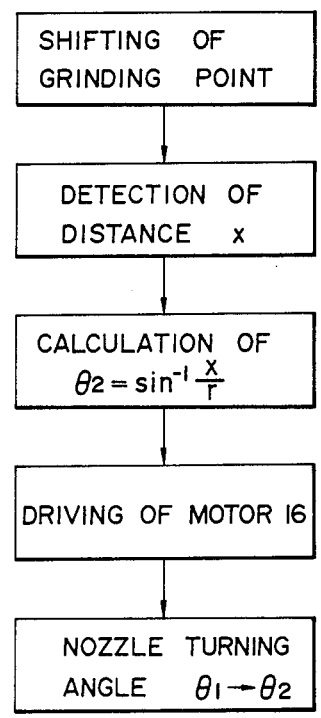
FIG. 5 is a flow chart showing how the turning means for the nozzles is controlled.

The flow chart for the above-mentioned control of the angle of turn for the nozzles, $\theta_1$, is shown in FIG. 5.

It is also possible to control the turning angle of the nozzles by numerical control, without using the above-mentioned method, based on numerical calculation of the values for the shape to be generated by the grinding.

Figure 6A:
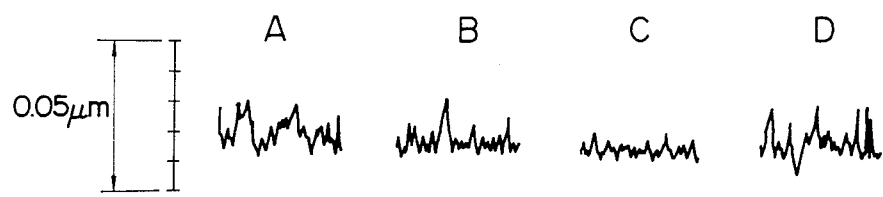
FIG. 6a gives data concerning the roughness of the surface ground using the conventional method of supplying grinding fluid.

The effects of this invention in its preferred embodiment described above will now be explained in reference to FIGS. 6a and 6b. FIG. 6a gives the data for the roughness of the surface of a spherical glass lens ground using conventional device supplying grinding fluid, while FIG. 6b gives the data obtained for the same process, but using the preferred embodiment of this invention.

Figure 6B:
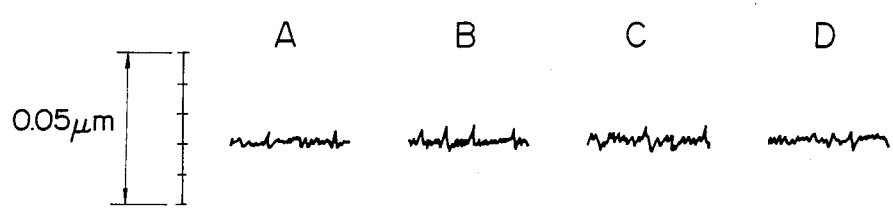
FIG. 6b is data concerning the roughness of the surface ground by the aid of the grinding fluid supplying device of the invention.

Points A, B, C and D in FIGS. 6a and 6b refer to positions on the surface of the object being ground a, spherical glass lens. The position A is located on the surface over the axis of rotation of the lens, which has a diameter of approximately 30 mm, and positions B, C and D are located radially away from A at equal 5 mm intervals on the surface of the lens. In FIG. 6a, which shows the data for surface finish obtained using the conventional device for supplying grinding fluid, the nozzles have been set so that they are directed at the grinding point in the vicinity of C, and it can be seen that the further the grinding point moves from C, the rougher the finish becomes, due to the increasing disparity between the grinding point and the direction in which the grinding fluid is being discharged. In contrast to this, however, FIG. 6b shows that the use of the preferred embodiment of this invention results in an equally good surface finish at all points.

In this way, by using the preferred embodiment, it is possible to move the grinding fluid supply nozzles to ensure a constant and sufficient supply of grinding fluid to the grinding point as it moves during the process, and achieve a grinding precision of 0.1 $\mu$m for a curved surface, and a surface finish of Ra on the order of 0.004 $\mu$m.

In the description of the preferred embodiment, the radius of curvature of the surface of the object to be ground 19 was taken as r, but even in the case of non-spherical surfaces, good results can be obtained by approximating the radius of curvature as r, meaning that this device for supplying grinding fluid is also applicable to the grinding of non-spherical surfaces.

Since the invention provides for the nozzles supplying the grinding fluid to turn on the axle of rotation of the grindstone, thus ensuring a constant supply of grinding fluid to the grinding point as it moves in the course of the process, clogging and wear of the grindstone are prevented, and an extremely high-precision, high quality surface can be obtained, thus offering various practical advantages.

What is claimed is:

1. A device for supplying a grinding fluid to an apparatus for grinding curved surfaces by means of a rotating grindstone, comprising: a pump for the grinding fluid; a pipe connected to one end of said pump for supplying said grinding fluid; a nozzle means directed at a grinding point for discharging the grinding fluid supplied by said pipe directly onto said grinding point; means for turning said nozzle means about the axis of rotation of the grindstone, said nozzle means rotating relative to the movement of the grindstone; and means for controlling the rotation of the said nozzle turning means to change the orientation of said nozzle means in response to a displacing movement of said grinding apparatus relative to a curved surface.

2. A device for supplying grinding fluid as claimed in claim 1, wherein said nozzle means includes one or more nozzles for discharging the grinding fluid directly onto the grinding point from at least one of the directions, parallel to the axis of the above-mentioned grindstone, and the direction at a tangent to the grindstone at the grinding point.

3. A device for supplying grinding fluid as claimed in claim 1, wherein said nozzle means includes a nozzle for discharging said grinding fluid directly onto the grinding point in a direction parallel to the axis of the above-mentioned grindstone, and a nozzle for discharging grinding fluid onto the grinding point at a tangent to the grinding point of the above-mentioned grindstone, both the said nozzles being turned by the same said nozzle turning means.

4. A device for supplying a grinding fluid to an apparatus for grinding curved surfaces by means of a rotating grindstone, comprising: a pump for the grinding fluid; a pipe connected to one end of said pump for supplying said grinding fluid; at least one nozzle for discharging the grinding fluid supplied by said pipe directly onto a grinding point from at least one of the direction parallel to the axis of said grindstone and the direction at a tangent to the grindstone at the grinding point; means for turning said nozzle about the axis of rotation of the grindstone, said nozzle rotating relative to the movement of the grindstone; and means for controlling the rotation of said nozzle turning means to change the orientation of said nozzle in response to a displacing movement of said grinding apparatus relative to a curved surface.

5. A device for supplying a grinding fluid as claimed in claim 4, wherein said nozzles include a nozzle for discharging grinding fluid directly onto the grinding point in a direction parallel to the axis of the above-mentioned grindstone, and a nozzle for discharging grinding fluid onto the grinding point at a tangent to the grinding point of the above-mentioned grindstone, both said nozzles being turned by the same said nozzle turning means.

6. A device for supplying a grinding fluid to an apparatus for grinding curved surfaces by means of a rotating grindstone, comprising: a pump for the grinding fluid; a pipe connected to one end of said pump for supplying the grinding fluid; a nozzle for discharging said grinding fluid supplied by said pipe directly onto a grinding point from a direction parallel to the axis of the above-mentioned grindstone, and a nozzle for discharging said grinding fluid directly onto said grinding point at a tangent to the grindstone at the grinding point; means for simultaneously turning said nozzles about the axis of rotation of the grindstone, said nozzles rotating relative to the movement of the grindstone; and means for controlling the rotation of said nozzle turning means to change the orientation of said nozzles in response to a displacing movement of said grinding apparatus relative to a curved surface.

* * * * *